US011905939B2

(12) United States Patent
Hines et al.

(10) Patent No.: US 11,905,939 B2
(45) Date of Patent: Feb. 20, 2024

(54) MECHANICALLY DRIVEN MODULAR DIAPHRAGM PUMP

(71) Applicant: Graco Minnesota Inc., Minneapolis, MN (US)

(72) Inventors: Bradley H. Hines, Andover, MN (US); Brian W. Koehn, Minneapolis, MN (US); Christopher C. Hines, Andover, MN (US); Adam K. Collins, Brooklyn Park, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 18/112,033

(22) Filed: Feb. 21, 2023

(65) Prior Publication Data

US 2023/0220839 A1 Jul. 13, 2023

Related U.S. Application Data

(63) Continuation of application No. 17/314,736, filed on May 7, 2021, now Pat. No. 11,639,713, which is a (Continued)

(51) Int. Cl.

| | |
|---|---|
| ***F04B 11/00*** | (2006.01) |
| ***F04B 53/22*** | (2006.01) |
| ***F04B 53/14*** | (2006.01) |
| ***F04B 45/04*** | (2006.01) |
| ***F04B 43/02*** | (2006.01) |
| ***B05B 9/04*** | (2006.01) |

(52) U.S. Cl.
CPC ........ *F04B 11/0025* (2013.01); *B05B 9/0413* (2013.01); *F04B 11/00* (2013.01); *F04B 43/02* (2013.01); *F04B 45/04* (2013.01); *F04B 53/147* (2013.01); *F04B 53/22* (2013.01)

(58) Field of Classification Search
CPC F04B 43/02; F04B 45/04; F04B 11/00; F04B 11/0025; F04B 53/22; F04B 53/147; B05B 9/0413
See application file for complete search history.

(56) References Cited

U.S. PATENT DOCUMENTS 1,052,206 A 2/1913 Bechman
1,762,065 A 6/1930 Lally
(Continued)

FOREIGN PATENT DOCUMENTS

JP 2009-047084 A 3/2009

*Primary Examiner* — Christopher S Bobish

(57) ABSTRACT

Modular mechanically driven diaphragm pump features are presented herein. Such a diaphragm pump can include a motor, a drive mechanism, and a coupling mounted on a wheeled frame. A diaphragm pump can be mounted to the coupling by forming mechanical static and dynamic connections to brace a housing of the diaphragm pump relative to a drive rod which is moved by the drive mechanism to operate the pump. These mechanical static and dynamic connections can be broken to dismount the pump for replacement or servicing. In some cases, a gas charge can be introduced on the non-working fluid side of the diaphragm to boost performance and/or a dampener can be integrated into the housing of the diaphragm pump and mounted/dismounted with the diaphragm pump.

20 Claims, 7 Drawing Sheets

Related U.S. Application Data continuation of application No. 16/099,128, filed as application No. PCT/US2017/031363 on May 5, 2017, now Pat. No. 11,002,261.

(60) Provisional application No. 62/399,713, filed on Sep. 26, 2016, provisional application No. 62/343,548, filed on May 31, 2016, provisional application No. 62/339,223, filed on May 20, 2016, provisional application No. 62/332,558, filed on May 6, 2016.

(56) References Cited

U.S. PATENT DOCUMENTS

| | | | | |
|---|---|---|---|---|
| 2,764,100 | A | 9/1956 | Maisch | |
| 2,811,929 | A * | 11/1957 | Rupp | F04B 9/06 92/84 |
| 3,136,227 | A | 6/1964 | Williams | |
| 3,471,175 | A | 10/1969 | Newton | |
| 3,559,574 | A | 2/1971 | Gates | |
| 3,764,236 | A | 10/1973 | Carter | |
| 3,814,086 | A * | 6/1974 | Lemb | A61H 33/0091 417/423.15 |
| 3,941,519 | A * | 3/1976 | McCauley | F04B 43/02 417/560 |
| 3,947,152 | A | 3/1976 | Ross et al. | |
| 4,049,364 | A | 9/1977 | Ross et al. | |
| 4,123,201 | A | 10/1978 | Andriulis | |
| 4,124,488 | A * | 11/1978 | Wilson | B01D 61/06 417/465 |
| 4,211,519 | A | 7/1980 | Hogan | |
| 4,231,287 | A * | 11/1980 | Smiley | F04B 43/046 417/413.1 |
| 4,594,059 | A * | 6/1986 | Becker | F04B 11/0033 417/540 |
| 4,635,621 | A * | 1/1987 | Atkinson | A61M 3/0202 601/161 |
| 4,637,193 | A * | 1/1987 | Lange | F16B 7/22 403/171 |
| 4,893,992 | A | 1/1990 | Schlect | |
| 4,895,494 | A | 1/1990 | Gardner | |
| 4,936,753 | A | 6/1990 | Kozumplik, Jr. et al. | |
| 5,165,867 | A | 11/1992 | Dockery | |
| 5,538,402 | A | 7/1996 | McKenney | |
| 5,540,556 | A | 7/1996 | Du | |
| 5,573,385 | A | 11/1996 | Chevallier | |
| 5,667,368 | A | 9/1997 | Augustyn | |
| 5,740,718 | A * | 4/1998 | Rathweg | F04B 53/164 92/255 |
| 5,749,709 | A | 5/1998 | Du | |
| 5,775,884 | A | 7/1998 | Westmoreland et al. | |
| 5,860,793 | A | 1/1999 | Muscarella et al. | |
| 6,000,916 | A | 12/1999 | Martin et al. | |
| 6,135,726 | A | 10/2000 | Robertson et al. | |
| 6,174,144 | B1 | 1/2001 | van Hamme et al. | |
| 6,311,943 | B1 | 11/2001 | Tang | |
| 6,533,488 | B2 * | 3/2003 | Blenkush | F04B 53/147 74/579 E |
| 6,764,284 | B2 * | 7/2004 | Oehman, Jr. | F01C 21/007 417/289 |
| 6,824,364 | B2 | 11/2004 | Ross et al. | |
| 7,128,541 | B2 * | 10/2006 | Kach | F04B 43/02 417/440 |
| 8,162,635 | B2 * | 4/2012 | Mizuno | F04B 43/02 417/543 |
| 8,177,524 | B1 * | 5/2012 | Kieffer | F04B 53/22 92/128 |
| 8,608,453 | B2 | 12/2013 | Paluncic et al. | |
| 8,727,752 | B2 * | 5/2014 | Lucas | B27B 21/04 417/540 |
| 8,932,031 | B2 | 1/2015 | Maguire et al. | |
| 9,004,881 | B2 | 4/2015 | Simmons et al. | |
| 9,068,567 | B2 * | 6/2015 | Hitter | F04B 53/16 |
| D742,927 | S | 11/2015 | Thompson et al. | |
| 9,243,623 | B2 * | 1/2016 | Lucas | F04B 11/00 |
| D752,649 | S | 3/2016 | Lins et al. | |
| D753,188 | S | 4/2016 | Kopel et al. | |
| 9,556,995 | B2 * | 1/2017 | Selwyn | F16L 55/053 |
| 10,077,771 | B2 | 9/2018 | Davidson et al. | |
| 10,094,375 | B2 | 10/2018 | Davidson et al. | |
| 10,371,145 | B2 | 8/2019 | Johnston et al. | |
| 10,465,678 | B2 | 11/2019 | Wrobel et al. | |
| 10,634,132 | B2 | 4/2020 | Carideo et al. | |
| 11,035,359 | B2 | 6/2021 | Thompson et al. | |
| 2003/0026647 | A1 | 2/2003 | Sasaki et al. | |
| 2003/0039563 | A1 * | 2/2003 | Arbuckle | F04B 43/026 417/413.1 |
| 2004/0208756 | A1 | 10/2004 | Adahan | |
| 2005/0052945 | A1 | 3/2005 | Maguire | |
| 2005/0196303 | A1 | 9/2005 | Kenney | |
| 2005/0249610 | A1 * | 11/2005 | Fischer | F04B 43/026 417/423.15 |
| 2006/0162549 | A1 * | 7/2006 | Wang | F16J 1/12 92/129 |
| 2008/0181800 | A1 * | 7/2008 | Muschalek | F04B 45/04 417/470 |
| 2012/0224987 | A1 | 9/2012 | Jones | |
| 2013/0183173 | A1 * | 7/2013 | Kohli | F04B 43/04 417/410.1 |
| 2014/0056743 | A1 | 2/2014 | Courtemanche | |
| 2015/0275891 | A1 * | 10/2015 | Chong | F04B 53/147 417/419 |
| 2018/0313344 | A1 | 11/2018 | Dawson et al. | |

* cited by examiner

MECHANICALLY DRIVEN MODULAR DIAPHRAGM PUMP

CROSS-REFERENCE TO RELATED APPLICATIONS

This is a continuation application of U.S. application Ser. 17/314,736, filed May 7, 2021, which in turn is a continuation application of U.S. application Ser. No. 16/099,128, filed Nov. 5, 2018, which in turn is a National Stage Application of PCT/US2017/031363 filed May 5, 2017, which in turn claims the benefit of each of U.S. Provisional Application No. 62/332,558 filed May 6, 2016, U.S. Provisional Application No. 62/339,223 filed May 20, 2016, U.S. Provisional Application No. 62/343,548 filed May 31, 2016, and U.S. Provisional Application No. 62/399,713 filed Sep. 26, 2016, the disclosures of which are hereby incorporated by reference herein in their entireties.

BACKGROUND

Diaphragm pumps can be useful for pumping fluids and gasses, particularly where versatility and contamination control are of concern and/or to move otherwise difficult to pump fluids. Many conventional diaphragm pumps are large and intended for permanent installation. Moreover, many conventional diaphragm pumps are not easily reconfigurable or serviceable, which can be particularly troublesome when using a diaphragm pump at a remote jobsite. Smaller diaphragm pump are easier to transport and handle, but have inherent output and flow limitations. These limitations can restrict the number of practical applications for diaphragm pumps. There is a continuing need for diaphragm pumps which are portable, reconfigurable, and serviceable while maintaining high performance.

SUMMARY

Several embodiments demonstrating modular mechanically driven diaphragm pump features are presented herein. A first embodiment includes a motor and a drive mechanism, the drive mechanism configured to convert rotational motion output from the motor into linear reciprocal motion. The first embodiment further includes a diaphragm pump comprising a diaphragm, a drive rod, and a housing, the diaphragm located within the housing, the drive rod connected to the diaphragm such that the diaphragm is moved by the drive rod. The first embodiment further comprises a coupling that mounts the diaphragm pump to the drive mechanism, the coupling forming a static connection that fixes the housing with respect to the frame and a dynamic connection that attaches the drive rod to the drive mechanism such that the drive mechanism can move the diaphragm relative to the housing by moving the drive rod, wherein the coupling is configured to dismount the diaphragm pump from the drive mechanism by disengaging the static connection and the dynamic connection.

A second embodiment of a modular diaphragm pump comprises a motor and a drive mechanism, the drive mechanism configured to convert rotational motion output from the motor into linear reciprocal motion. The second embodiment further comprises a diaphragm pump comprising a diaphragm, a drive rod, and a housing, the diaphragm located within the housing, the drive rod configured to be reciprocated by the drive mechanism to move the diaphragm. In the second embodiment, the housing and the diaphragm form a first chamber and a second chamber, the first chamber is formed in part by a first side of the diaphragm and the second chamber is formed in part by a second side of the diaphragm, the diaphragm is configured to be moved via the drive rod to expand and contract the volumes of the first chamber to pump fluid through the first chamber, and the second chamber is configured to hold a gas under pressure such that the gas applies pressure on the second side of the diaphragm to increase the pumping force generated by the diaphragm pump.

A third embodiment of a modular diaphragm pump comprises a motor and a drive mechanism, the drive mechanism configured to convert rotational motion output from the motor into linear reciprocal motion. The third embodiment further comprises a diaphragm pump comprising a diaphragm, a drive rod, and a housing, the diaphragm located within the housing, the drive rod connected to the diaphragm such that the diaphragm moves with the drive rod to pump a fluid. The third embodiment further comprises a dampener mounted to the housing, the dampener comprising a second diaphragm that contacts the pumped fluid and moves to reduce downstream flow pulsation due to upstream flow pulsation created by movement of the diaphragm in pumping the fluid.

The scope of this disclosure is not limited to this summary. Further inventive aspects are presented in the drawings and elsewhere in this specification and in the claims.

This disclosure makes use of multiple embodiments and examples to demonstrate various inventive aspects. The presentation of the featured embodiments and examples should be understood as demonstrating a number of open-ended combinable options and not restricted embodiments. Changes can be made in form and detail to the various embodiments and features without departing from the spirit and scope of the invention.

DETAILED DESCRIPTION

Embodiments of the present disclosure are used to pump fluids. Various types of fluids can be pumped, including fluids containing solid matter. Each pump actuates at least one diaphragm in an interior space of a pump housing to increase and decrease the size of a chamber formed by the diaphragm and housing. Check valves are used to control the flow of fluid into and out of the chamber so that the diaphragm pump productively moves the fluid from an inlet to an outlet. A motor and a drive mechanism are used to move the diaphragm, such as via a drive rod. There are various different types of drive motors as well as various different types of diaphragm pumps. Different types of drive motors and/or diaphragm pumps can be available to users and can be easily combined and swapped onsite to suit the particular and changing needs of the user. For example, one type of diaphragm pump may have a diaphragm sized for high pressure while another type of diaphragm pump may have a diaphragm sized for high flow. As another example, different materials used to construct different diaphragm pumps may have different chemical resistances and thus different suitabilities for different pumping tasks in a particular project. Additionally or alternatively, a diaphragm pump may wear and need replacement or may be in need of servicing onsite. Aspects of diaphragm pump modularity are disclosed herein to address these and/or other needs.

Figure 1:
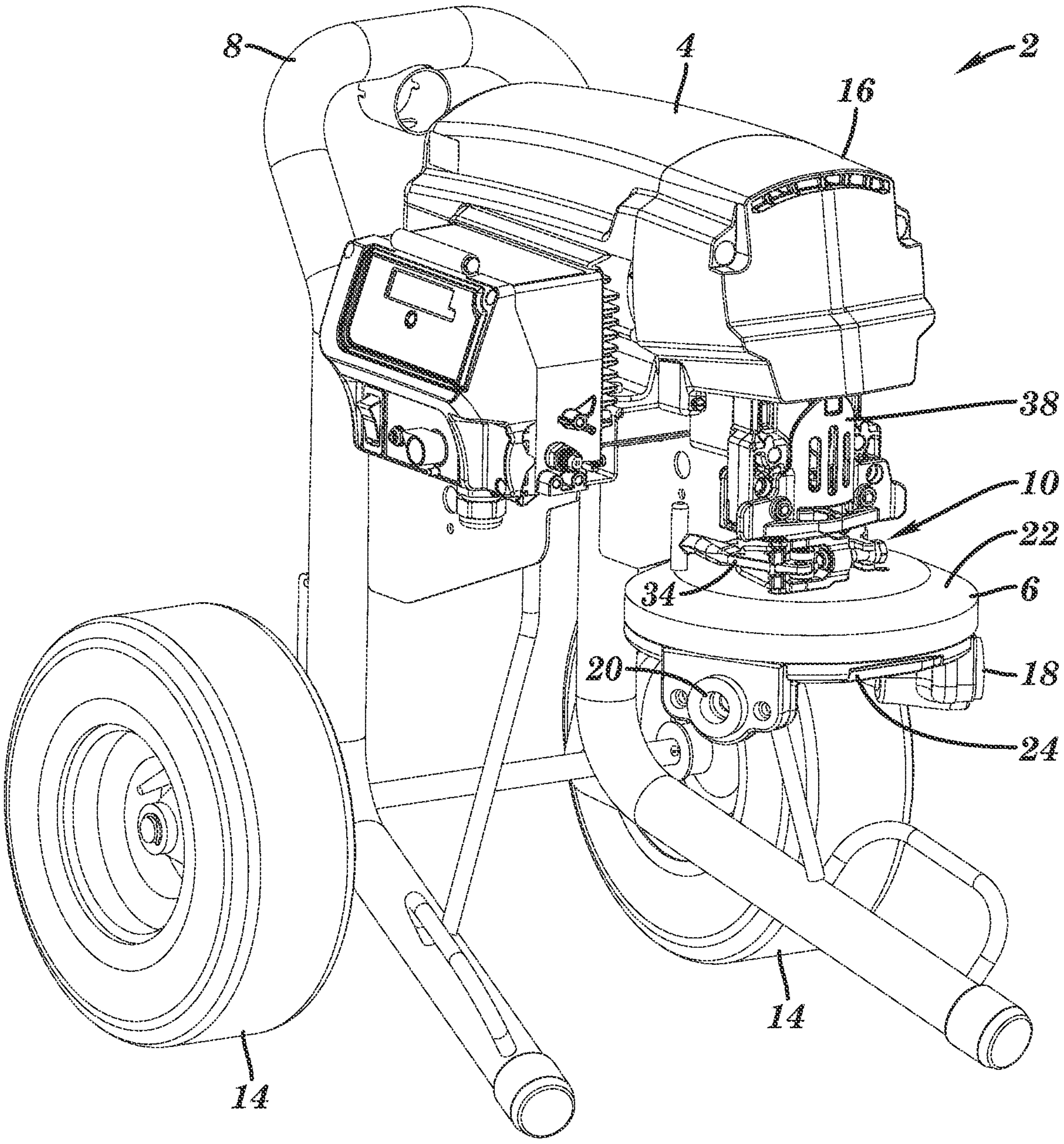
FIG. 1 is an isometric view of a modular diaphragm pump system.

FIG. 1 is a perspective view of a modular diaphragm pump system 2. The modular diaphragm pump system 2 includes reciprocating power unit 16 onto which a diaphragm pump 6 is mounted. The reciprocating power unit 16 provides reciprocating motion to operate the diaphragm pump 6. The reciprocating power unit 16 includes a motor 4. While an electric rotary drive motor (e.g., a conventional brushless direct current rotor stator motor) is shown herein, the motor 4 can be any type of electric, combustion (e.g., gas or diesel), pneumatic, or hydraulic motor. The motor 4 outputs rotational motion. As shown further herein, the reciprocating power unit 16 includes a drive mechanism to convert the rotational motion output by the motor 4 to linear reciprocating motion.

The reciprocating power unit 16 includes a structural frame 8. The structural frame 8 can include vertically and/or horizontally orientated metal tubes. The structural frame 8 is portable and not attached or anchored to a larger structure. Wheels 14 are attached to the structural frame 8 for wheeling the fluid pumping system 2 around for portability. The motor 4 and drive mechanism are mounted on the structural frame 8.

A diaphragm pump 6 is mounted to the reciprocating power unit 16 by a pump coupling 10. A portion of the coupling 10 is located behind door 38. As further shown herein, the door 38 can be opened to mount and dismount the diaphragm pump 6 from the reciprocating power unit 16. The diaphragm pump 6 is secured to the reciprocating power unit 16, at least in part, by clamp 34. The clamp 34 is part of the coupling 10. The clamp 34 wraps around the diaphragm pump 6 to fix the diaphragm pump 6 to the reciprocating power unit 16. The diaphragm pump 6 may only be attached to the reciprocating power unit 16 via the pump coupling 10. In this way, the diaphragm pump 6 may not be attached directly or indirectly to the structural frame 8 or other part of the reciprocating power unit 16 except via the pump coupling 10. This single area of attachment between the diaphragm pump 6 and the reciprocating power unit 16 facilitates modular removal and replacement of the diaphragm pump 6 from the fluid pumping system 2 as further discussed herein.

The diaphragm pump 6 includes a pump housing formed by a first pump cover 22 and a second pump cover 24. The pump covers 22, 24 may be threaded, bolted, welded, adhered, or otherwise rigidly attached to each other to form the pump housing. The pump covers 22, 24 can be formed from metal (e.g., stainless steel) or polymer (e.g., polytetrafluoroethylene). The diaphragm pump 6 includes an inlet port 20 through which fluid being pumped (i.e. working fluid) is moved into the diaphragm pump 6. The diaphragm pump 6 includes an outlet port 18 through which the fluid is expelled from the diaphragm pump 6. Pipes, tubes, manifolds, connectors, and the like, which are not illustrated but are known in the art, can be connected to the outlet port 18 and the inlet port 20 to manage fluid flow.

Figure 2:
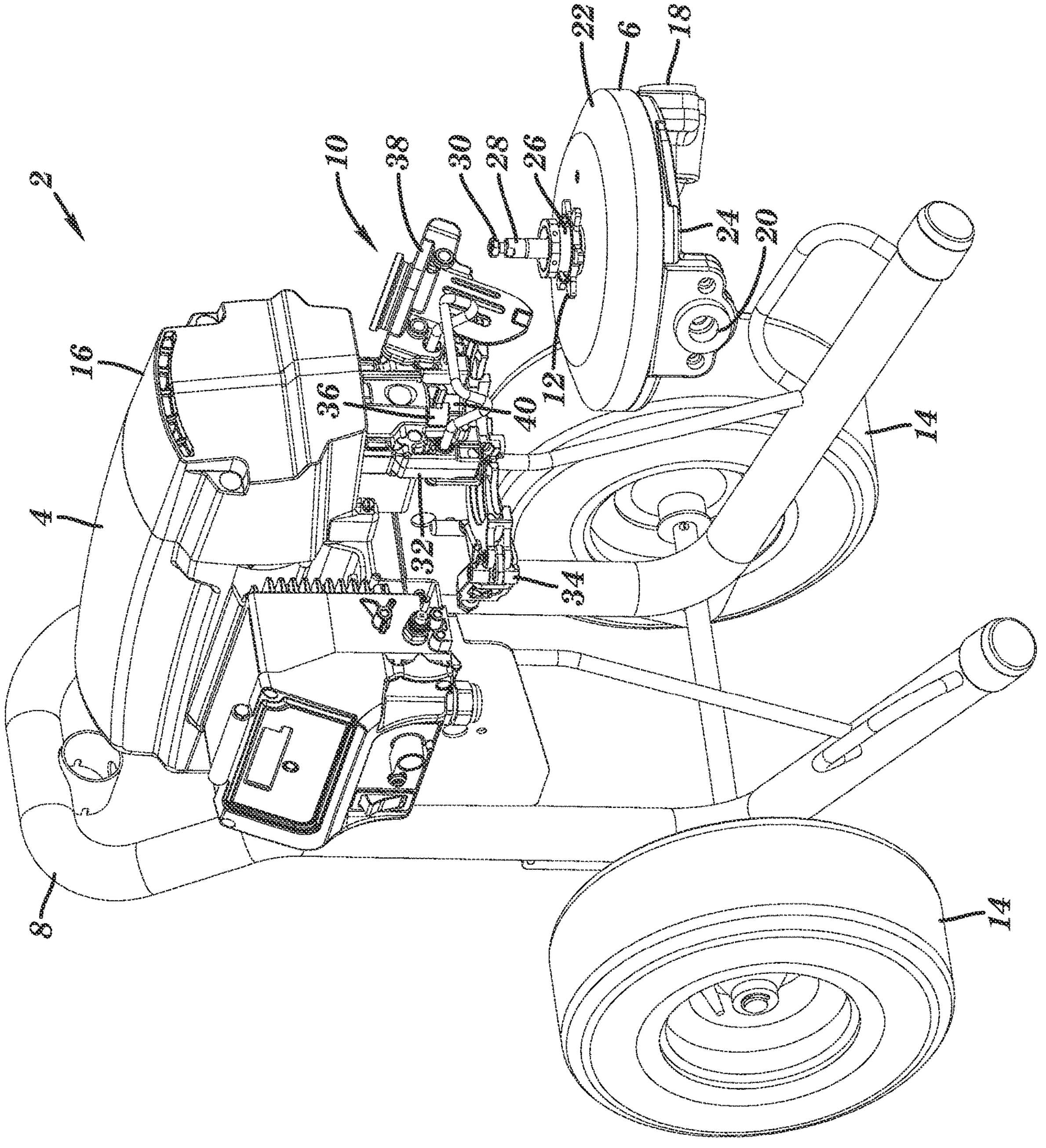
FIG. 2 is an isometric view of the modular diaphragm pump system of FIG. 1 with the modular diaphragm pump removed.

FIG. 2 is a perspective view of the fluid pumping system 2 similar to that of FIG. 1 except that in FIG. 2 the diaphragm pump 6 has been dismounted from the reciprocating power unit 16. As shown, the diaphragm pump 6 includes a pump neck 26. The pump neck 26 is shown as a cylindrical element, however the pump neck 26 can take different shapes. The pump neck 26 projects upwards from the first pump cover 22. The pump neck 26 can be directly attached, or integral and continuous with, the first pump cover 22. The pump neck 26 can indirectly attach to the second pump cover 24. The first pump cover 22 can be directly attached to the second pump cover 24 although an intermediary housing structure may be placed between the pump covers 22, 24. The diaphragm pump 6 further includes a drive rod 28. The drive rod 28 protrudes out from the pump neck 26. The drive rod 28 can be formed from metal. As further shown herein, the drive rod 28 is reciprocated by the drive mechanism of the reciprocating power unit 16 relative to the pump neck 26 and the pump covers 22, 24. The pump neck 26 can be part of the pump housing, together with the pump covers 22, 24, of the diaphragm pump 6. The drive rod 28 includes a head 30 which attaches to a collar 36 of the pump coupling 10.

To dismount the diaphragm pump 6, the door 38 is opened to further expose the pump coupling 10. The pump coupling 10 includes a pump mount frame 32. The pump mount frame 32 is formed from metal and is rigidly fixed, directly or indirectly, to the structural frame 8 of the reciprocating power unit 16. The pump mount frame 32 structurally supports the diaphragm pump 6 when the diaphragm pump 6 is attached to the pump coupling 10. The pump mount frame 32 includes a receiver 40. The receiver 40 is a recessed space within the pump mount frame 32 into which part of the diaphragm pump 6 is placed and secured when the diaphragm pump 6 is mounted on the pump coupling 10. For example, the pump neck 26 and drive rod 28 can be received in the receiver 40 when then diaphragm pump 6 is mounted on the pump coupling 10. A nut 12 is located around the pump neck 26. A portion of the pump neck 26 can be threaded to engage with inner threading on the nut 12 and allow the nut 12 to move up and down the pump neck 26 by relative rotation between the nut 12 and the pump neck 26.

When the diaphragm pump 6 is mounted, the nut 12 can then be tightened against the bottom of the pump mount frame 32 to clamp and secure the pump neck 26, and the rest of the diaphragm pump 6, to the pump mount frame 32. To allow the diaphragm pump 6 to be dismounted, the nut 12 can be rotated to move the nut 12 down the pump neck 26 and away from the bottom of the pump mount frame 32 to relieve the clamping force on the pump mount frame 32. The nut 12 engaging with the pump mount frame 32 is one of several mechanisms that can be additionally or alternatively employed to secure the diaphragm pump 6 to the reciprocating power unit 16. For example, the pump coupling 10 in the illustrated embodiment is shown to include the clamp 34. The clamp 34 is shown in an open position in FIG. 2, allowing the pump neck 26 to be removed from the receiver 40 and the diaphragm pump 6 to be dismounted from the reciprocating power unit 16. The clamp 34 can fix the diaphragm pump 6 to the pump mount frame 32.

Figure 3:
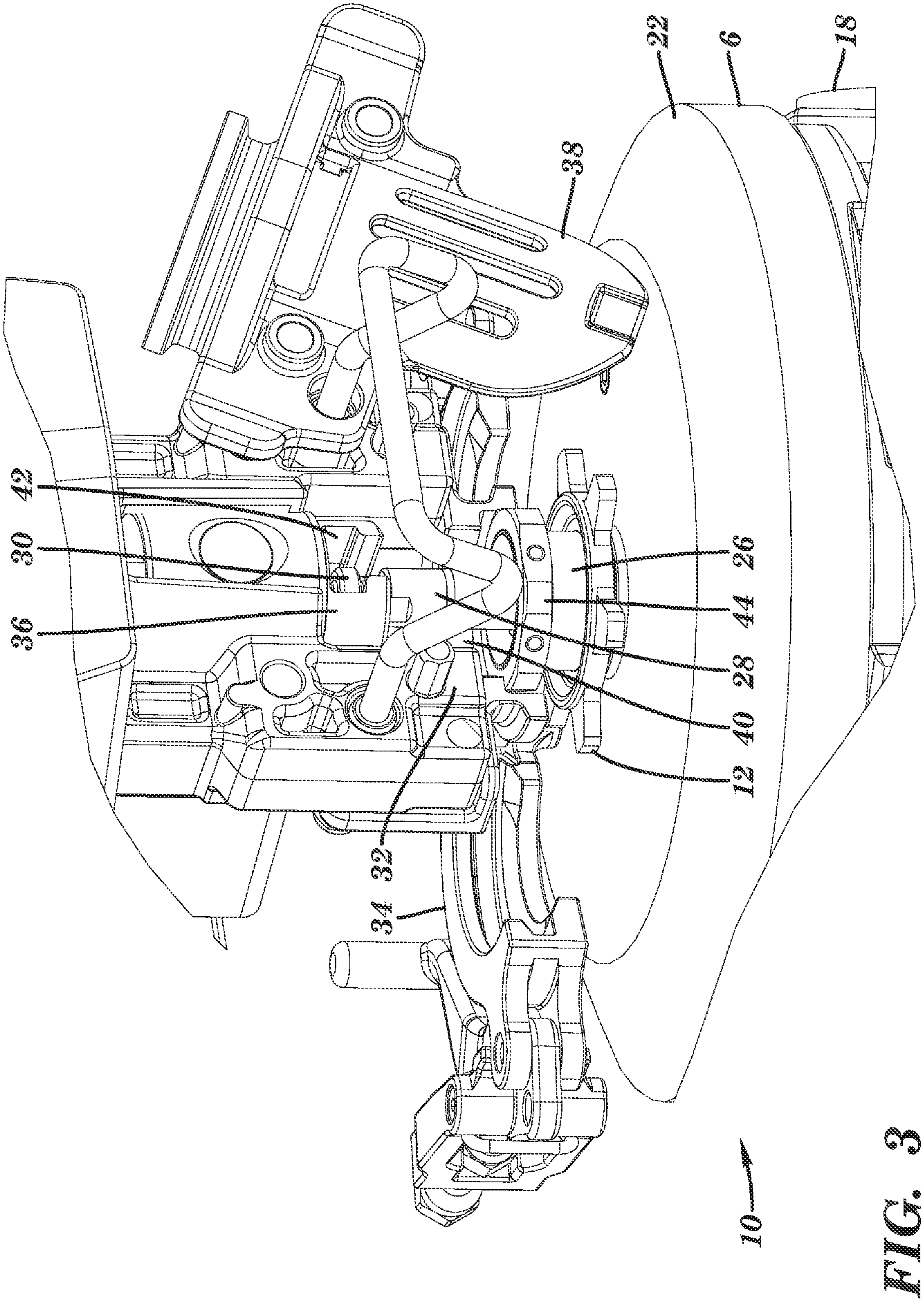
FIGS. 3-4 are detailed views showing the decoupling of the modular diaphragm pump from the rest of the modular diaphragm pump system of FIG. 1.
Figure 4:
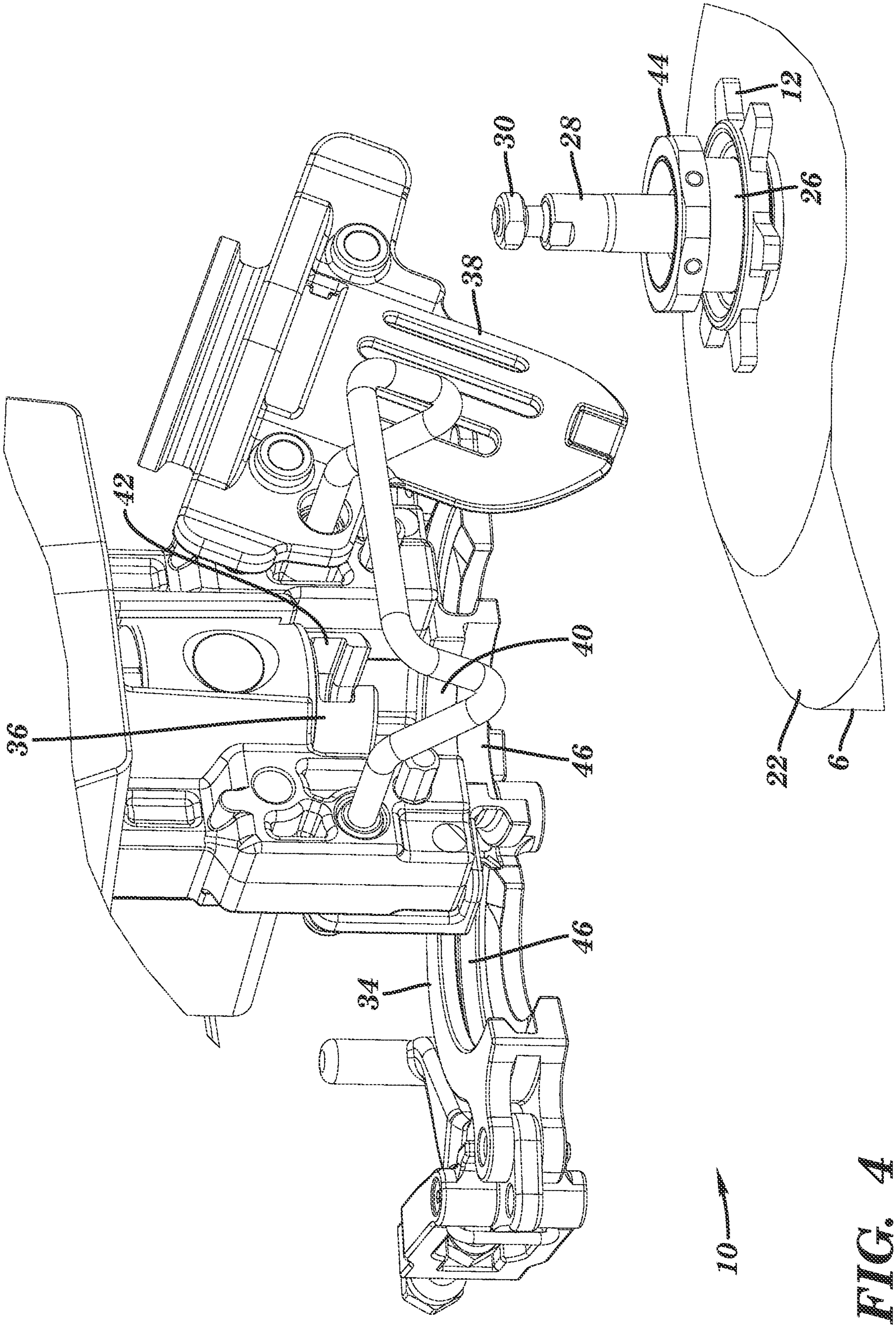

FIGS. 3-4 show detailed views of the pump coupling 10 of the previous Figs. In particular, the progression of FIGS. 3-4 shows the dismounting of the diaphragm pump 6 via the pump coupling 10. FIG. 3 shows the diaphragm pump 6 in a mounted state. The door 38 is opened to expose the receiver 40 and the clamp 34 is likewise open to allow removal of the diaphragm pump 6. As shown, the door 38 is mounted on a guard. Collar 36 is part of the coupling 10. As shown in FIG. 3, the collar 36 includes a slot 42. The slot 42 accepts the head 30 of the drive rod 28. Mechanical elements, other than a collar 36 and head 30, can connect to the drive rod 28 to the drive mechanism for reciprocating the drive rod 28. For example, a metal pin that extends through aligned holes in the collar 36 and the drive rod 28 can couple the collar 36 and the drive rod 28, wherein the holes extend transverse to the long axes of the collar 36 and the drive rod 28.

FIGS. 3-4 show that the pump neck 26 can include a rib 44 or other peripheral protrusion. The rib 44 extends entirely around the pump neck 26. The rib 44 is annular. The rib 44 fits into a groove 46 of the coupling 10. In this case, the rib 44 fits into a groove of the clamp 34, and into a groove 46 formed in the pump mount frame 32, to index the position of the pump neck 26 and prevent movement of the pump neck 26 (forming part of the pump housing) relative to the drive rod 36 when the drive rod 36 is moved. The locations of the rib 44 and groove 46 can be reversed. In some alternative designs of the pump coupling 10, a shelf of the pump mount frame 32 could be located within the receiver 40, such as forming the bottom of the receiver 40. The rib 44 or other peripheral protrusion can be placed on top of the shelf while the nut 12 is tightened against the bottom of the shelf to clamp the shelf between the nut 12 and the rib 44 or other peripheral protrusion to secure the diaphragm pump 6. In such an alternative design, the particular clamp 34 and/or groove 46 may not be included. Other designs for the pump coupling 10 are possible. In other alternative designs, the pump mount frame 32 includes one or more projections (e.g., pins) which are received by one or more apertures formed in the pump neck 26 or other part of the diaphragm pump 6.

The interface between the rib 44 or other peripheral protrusion and the groove 46 or other part of the pump mount frame 32, the interface between nut 12 and the bottom of the pump mount frame 32, the locking of the clamp 34 on the pump neck 26, and/or the reception of the pump neck 26 in the receiver 40 forms a static connection. The static connection fixes the pump neck 26, as well as the rest of the housing of the diaphragm pump 6 (e.g., the covers 22, 24) to the pump mount frame 32. When the static connection is made, the pump neck 26, as well as the rest of the housing of the diaphragm pump 6 (e.g., the covers 22, 24), will not move relative to the pump mount frame 32, the structural frame 18, and other non-moving parts of the reciprocating power unit 16 despite the collar 42 of the reciprocating power unit 16 moving the drive rod 28 of the diaphragm pump 6. The interface of the drive rod 28 with the collar 36 forms a dynamic connection whereby the drive rod 28 and the collar 36 move together. As demonstrated in FIGS. 3-4, a sliding motion removes the pump neck 26 from the recess 40 (and the rib 44 out of the groove 46) and also removes the head 30 of the piston 28 from the slot 42 of the collar 36. This single sliding motion simultaneously disengages both the static and dynamic connections, assuming any clamps are loosened. It is noted that before the sliding motion to dismount the diaphragm pump 6, the clamp 34 and nut 12 were loosened. Dismounting of the diaphragm pump 6 allows the diaphragm pump 6 to be cleaned and serviced. Alternatively, the diaphragm pump 6 can be removed in this manner for replacement by a newer, cleaner, or alternatively configured diaphragm pump 6 (e.g., a larger, smaller, or adapted for different fluids, pressures, viscosities, and/or chemical resistances). In either case, diaphragm pump 6 or a different diaphragm pump can be remounted by essentially a similar, but opposite, sliding motion and then tightening of any clamps. The diaphragm pump 6 is slid in a single linear motion to simultaneously engage (or reengage) the static and dynamic connections.

Figure 5:
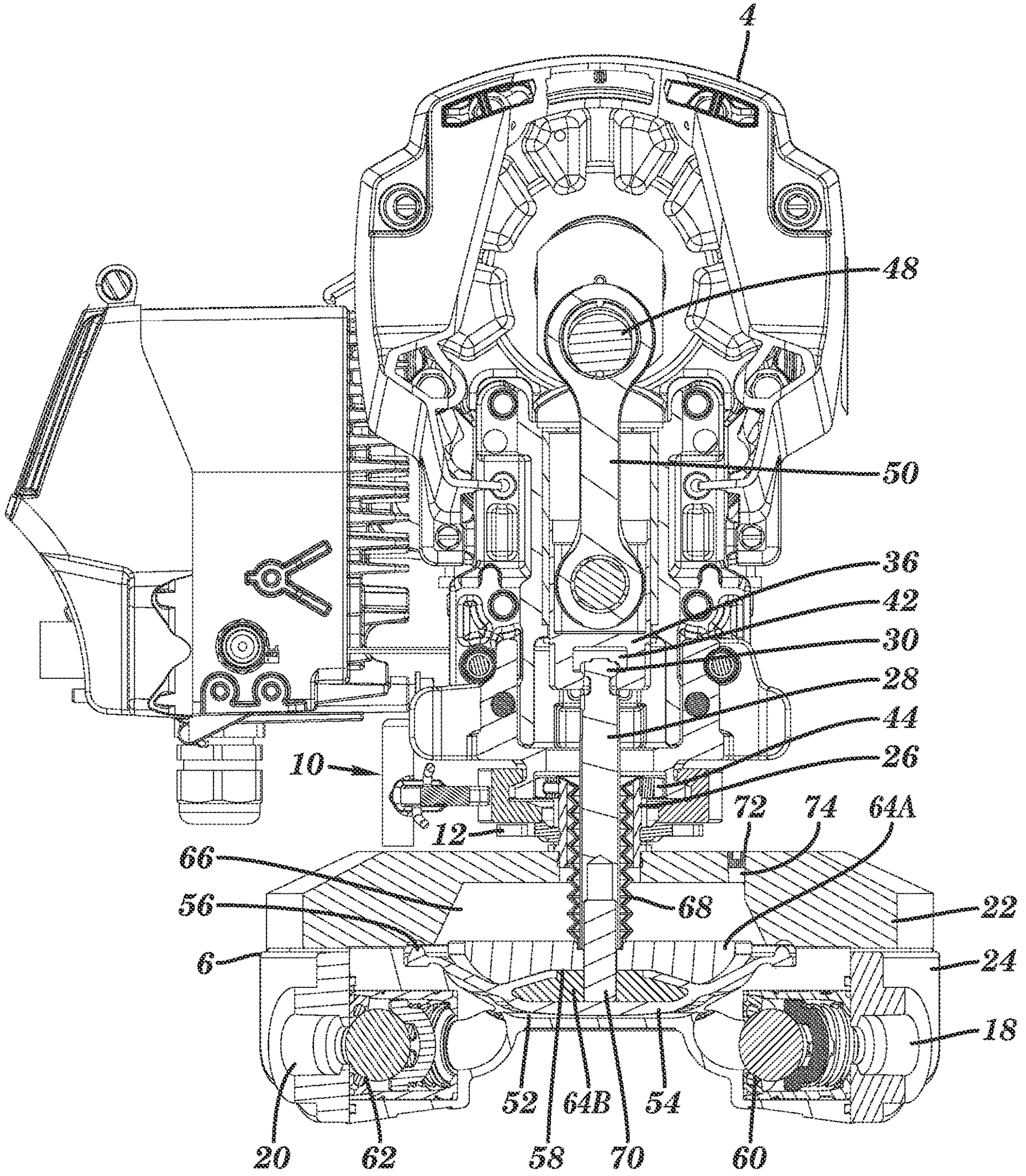
FIG. 5 is a sectional view of part of the modular diaphragm pump system of FIG. 1.

FIG. 5 is a sectional view showing the diaphragm pump 6, pump coupling 10, drive mechanism, and motor 4 of the fluid pumping system 2. The motor 4 outputs rotational motion (e.g., via a pinion) which is converted by the drive mechanism into linear reciprocal motion. The drive mechanism includes eccentric 48 and connecting arm 50 connected as a crank mechanism. The top of the connecting arm 50 is connected to the eccentric 48 while the bottom of the connecting arm 50 is attached to the collar 36. Rotation of the eccentric 48 by the motor 4 moves the bottom of the connecting arm 50 in a linear reciprocating manner. As an alternative drive mechanism, a scotch yoke could convert rotation motion of the eccentric 48 into liner reciprocating motion of the collar 36. The collar 36 is restrained in a guide of the pump mount frame 32 to only slide in a linear manner, such as only up and down. The head 30 of the drive rod 28 is cradled in the slot 42 of the collar 36. The head 30, and the rest of the drive rod 28, moves up and down with the movement of the collar 36.

The diaphragm pump 6 includes a diaphragm 54 sandwiched between the first and second pump covers 22, 24. The middle of the diaphragm 54 is allowed to move while the rim 56 of the diaphragm 54 is pinched and secured between the first and second pump covers 22, 24. The diaphragm 54 can be formed from rubber or other flexible and resilient material. The first and second pump covers 22, 24 define a space which is divided by the diaphragm 54 to include a first chamber 52 and a second chamber 66. The first chamber 52 is a working fluid chamber in that fluid being pumped is moved through the first chamber 52 by movement of the diaphragm 54. Fluid from the inlet port 20 is drawn into the first chamber 52 when the diaphragm 54 moves upwards. More specifically, on the upstroke of the diaphragm 54, fluid is sucked through the first check valve 62 as the volume of the first chamber 52 increases due to the upward movement of the diaphragm 54. Fluid is forced out of the first chamber 52 through second valve 60 when the diaphragm 54 moves downwards. More specifically, on the downstroke of the diaphragm 54, fluid is forced from first chamber 52 as the volume of the first chamber 52 decreases due to the downward movement of the diaphragm 54. The orientations of the first and second check valves 62, 60 manage the direction of fluid flow in an upstream-to-downstream direction (i.e. from inlet port 20 to outlet port 18) by preventing retrograde downstream-to-upstream flow. The first and second check valves 62, 60 are shown as each comprising a ball, a seat, and a spring, however other check valve designs can be substituted. Due to the direction of flow of fluid managed by the first and second check valves 62, 60, these valves can be inlet and outlet check valves, respectively. The first and second check valves 62, 60 as well as the inlet and outlet ports 20, 18 are integrated into the housing of the diaphragm pump 6.

The drive rod 28 is attached to the diaphragm 54 (directly or indirectly) by a connector 58. The connector 58 moves with the drive rod 28. In the illustrated embodiment, the connector 58 comprises two plates 64A-B which sandwich a portion of the diaphragm 54. The diaphragm 54 may be connected with the drive rod 28 in other ways. The middle of the diaphragm 54 moves up and down with the drive rod 28. The spacing between the drive rod 28 and the connector 58 can be adjusted. Changing the separation distance allows the depth of movement of the diaphragm 54 in the first chamber 52 to be adjusted. A spacer 70 can be embedded or otherwise fixed to one or both of the plates 64A-B. Spacer 70 can be threadedly received within the bottom of the drive rod 28 such that rotation of the drive rod 28 relative to the spacer 70 increases or decreases the separation between the drive rod 28 and the diaphragm 54. Other spacing adjustment mechanisms can be substituted.

The diaphragm pump 6 is shown to include a channel 74 through the pump housing. More specifically, the channel 74 is formed through the first cover 22. The channel 74 allows air to move in and out of the second chamber 66. The channel 74 may be open in some configurations to freely let air into, and out of, the second chamber 66 during pumping. In some configurations, a valve 72 in the channel 74 prevents the flow of air through the channel 74, or at least in one direction. Specifically, the valve 72 can be check valve (e.g., ball, seat, and spring) that lets air into the second chamber 66 but prevents air in the second chamber 66 from escaping outside. The valve 72 may be a plug fit into the channel 74 (e.g., threadedly engaged with the channel 74). In some embodiments, pressurized gas is kept within the second chamber 66 during pumping by the valve 72, as further discussed herein.

Just considering the mechanical force (and not pneumatic force) developed by the motion of the diaphragm 54, the change in pressure of the working fluid in the first chamber 52 during the down stroke is determined by the mechanical force pushing on the diaphragm 54 by the drive mechanism (via the drive rod 28) and the effective surface area of the diaphragm 54. For example, 1000 pounds of force pushing on the diaphragm 54 with a surface area of 10 square inches would generate a fluid pressure change of 100 PSI (1000 pounds/10 square inches). To create higher fluid pressures, the motor 4 may require higher horse power or a different drive mechanism. Even if these aspects are changed, they may only be partially utilized because the upstroke (i.e. the suction stroke) requires much lower motor 4 horse power and drive forces. Instead of increasing the power of the motor 4 or changing the drive mechanism, a gas charge can be provided in the second chamber 66 to increase the power of the downstroke, as further discussed herein.

The second chamber 66 can contain pressurized gas. The pressurized gas maintained within the second chamber 66 can be any gas, such as pressurized ambient air. The pressurized gas is supplied through the channel 74 and kept within the second chamber 66 by valve 72. Assuming no intentional or unintentional loss of the gas over repeated reciprocation cycles, the pressurized gas is maintained on the non-working fluid side of the diaphragm 54 and in particular within the second chamber 66. The gas expands on a downstroke of the diaphragm 54 to increase pumping stroke force through the diaphragm 54, and the gas is recompressed on the upstroke of the diaphragm 54 by the diaphragm 54. The pressurized gas applies a distributed load on the non-working fluid side (top side) of the diaphragm 54 which in turn applies an equal force on the working fluid side (bottom side) of the diaphragm 54 in the first chamber 52 to increase the working fluid pressure in the first chamber 52. For example, if the second chamber 66 is charged with 100 PSI of gas, this charge can add 100 PSI to the working fluid pressure within the first chamber 52. This increase in working fluid pressure is additive to the change in working fluid pressure caused by the mechanical drive force applied by the motion of the diaphragm 54 as driven by the drive mechanism via the drive rod 28.

Providing the gas charge in the second chamber 66 to increase the working fluid pressure increases the output pressure of the modular diaphragm pump system 2 which would otherwise require an increase the horsepower of the motor 4 or change in the drive mechanism. As such, the gas charge allows the fluid pumping system 2 to be smaller and possible more portable while maintaining high performance. Due to the gas charge in the second chamber 66, the motor 4 and drive mechanism experiences an increase in load during the upstroke due. However, this load occurs at a time when the motor 4 load and drive forces are normally low and does not require increased motor 4 horse power or changed drive mechanism to overcome.

The additive pressure due to the gas charge may minimize the pressure differential between the top and bottom sides of the diaphragm 54 which can minimize diaphragm 54 distortion and thereby increase diaphragm 54 life. As an example, a mechanical diaphragm pump having a diaphragm with a 10 square inch surface area that is intended to generate 200 PSI on the working fluid requires 2000 pounds of force from the motor 4 and drive mechanism and creates a 200 PSI a pressure differential across the diaphragm 54 (200 PSI on the bottom side and zero PSI on the top side of the diaphragm 54). A high pressure differential across the diaphragm 54 risks distorting the diaphragm 54. However, if a 100 PSI gas charge is in the second chamber 66, the motor 4 and drive mechanism need only generate 1000 pounds of force and this creates only a 100 PSI pressure differential across the diaphragm 54 (200 PSI on the bottom side and 100 PSI on the top side of the diaphragm) to generate the same 200 PSI working fluid pressure, thereby decreasing the risk of distorting the diaphragm 54.

The pressurized gas can be introduced to the second chamber 66 via channel 74. A conventional hose from a conventional compressor or a conventional air tank (not shown), all known in the art, can attach to valve 72 and/or channel 74 (e.g., by a threaded interface) to supply pressurized atmospheric air or gas to the second chamber 66. In some embodiments, the pressurized gas within the second chamber 66 is provided through the channel 74 soon after the diaphragm pump 6 is assembled and remains in the second chamber 66 during operation (multiple reciprocation cycles) of the diaphragm pump 6 without release or replenishment until the diaphragm pump 6 is disassembled. In some embodiments, the conventional compressor or air tank may, with a conventional pressure regulator, add additional gas as necessary during and/or between reciprocation cycles to respond to user input or account for loss of gas. A pressure sensor may be provided within the second chamber 66 to monitor the pressure within the second chamber 66 and automatically control the conventional regulator to introduce additional gas or release gas via the channel 74 to maintain a pressure level or range.

When utilizing the gas charge feature, the second chamber 66 can be sealed such that the pressure within the second chamber 66 remains constant (or near constant) between repeated reciprocation cycles. The static interfaces forming the second chamber 66 are sealed. For example, the diaphragm 54 is sealed about its rim 56 within the first and second covers 22, 24. The diaphragm 54 is also sealed about the plate 64A. Dynamic interfaces of the second chamber 66 are also sealed. The seal between the drive rod 28 and the pump neck 26 is, at least during pumping, a dynamic seal in that the drive rod 28 moves relative to the pump neck 26. The seal 68 is in contact with the drive rod 28.

Dynamic sealing is provided by seal 68. Seal 68 prevents compressed gas (or working fluid if the second chamber encounters fluid being pumped) from escaping the second chamber 66 along the drive rod 28. Seal 68 is a tubular bellows. The seal 68 can be coaxial with the drive rod 28. Seal 68 can extend along the drive rod 28. Seal 68 can surround the drive rod 28 within the second chamber 66. The seal 68 can be formed from rubber, such as ethylene propylene. Seal 68 can stretch and compress. The seal 68 flexes along repeated waves or folds. Tails are located on opposite ends of the seal 68. A tail on the top end of the seal 68 is circumferentially pinched by, attached to, or otherwise pressed against the rib 44 and/or the pump neck 26 to seal the top end of the seal 68. The tail on the top end of the seal 68 can be circumferentially pinched, attached, or presses against other parts of the pump neck 26 or other part of the diaphragm pump 6. The tail on the bottom end of the seal 68 can be circumferentially pinched by, attached to, or otherwise pressed against the exterior of the drive rod 28 and/or the inside of the plate 64A to seal the bottom end of the seal 68. The tail on the bottom end of the seal 68 can be circumferentially pinched, attached, or presses against other parts of the diaphragm pump 6. Since the seal 68 is a flexible membrane rather than a sliding seal, it is not worn away by abrasive working fluids.

Figure 7:
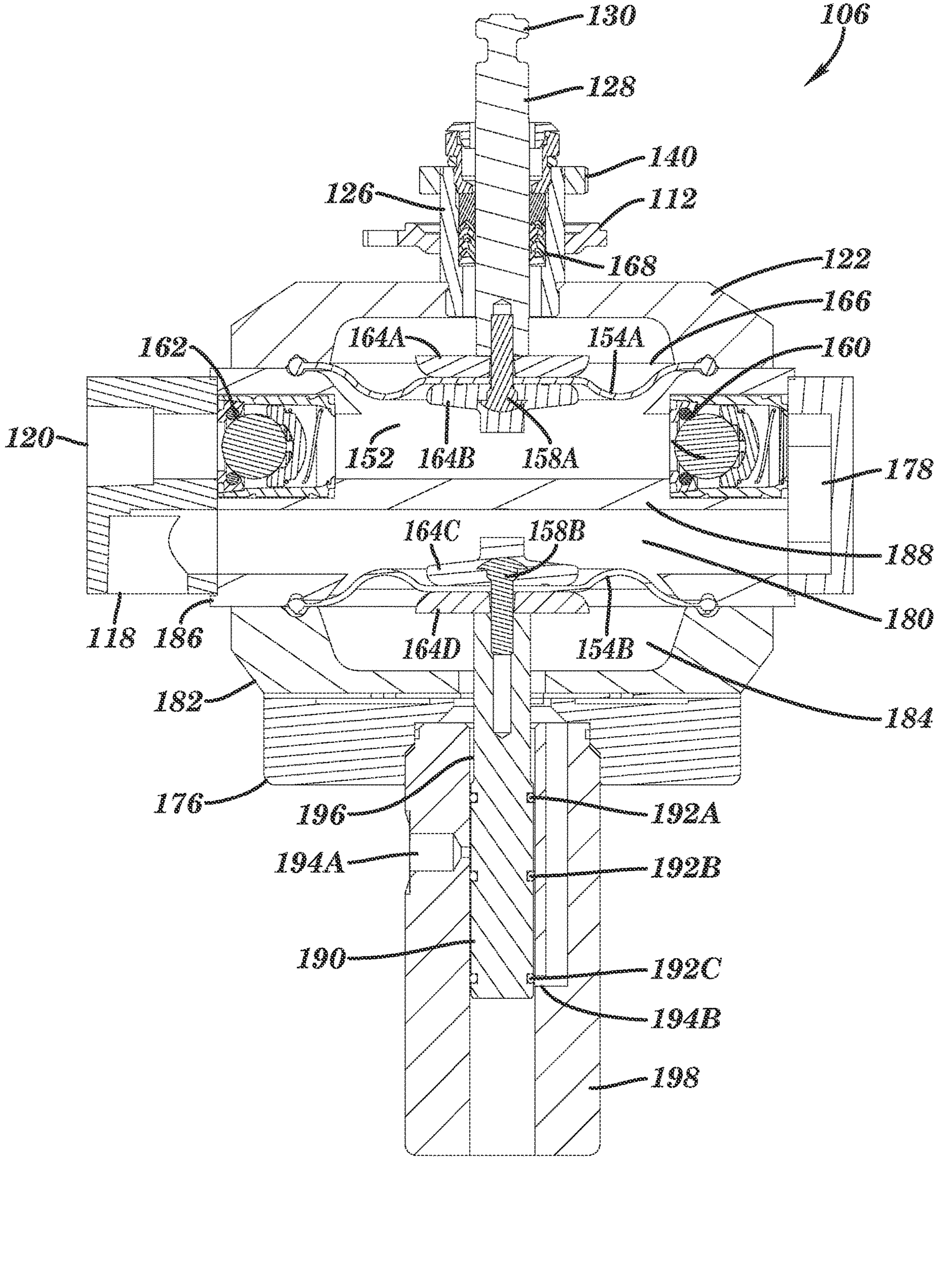
FIG. 7 is a cross sectional view of the modular diaphragm pump of FIG. 6 having the integrated dampener.

As alternatives to seal 68, a stack of polymer and/or leather rings can be located within a cylindrical space defined within the pump neck 26 and around the drive rod 28, the rings sealing between the inner surface of the pump neck 26 and the outer surface of the drive rod 28. The rings stay stationary with either the pump neck 26 or the drive rod 28, and slide relative to the other of the pump neck 26 or the drive rod 28. Such rings are shown in FIG. 7. In some embodiments, the stack of rings can be replaced by a sleeve or bushing.

Figure 6:
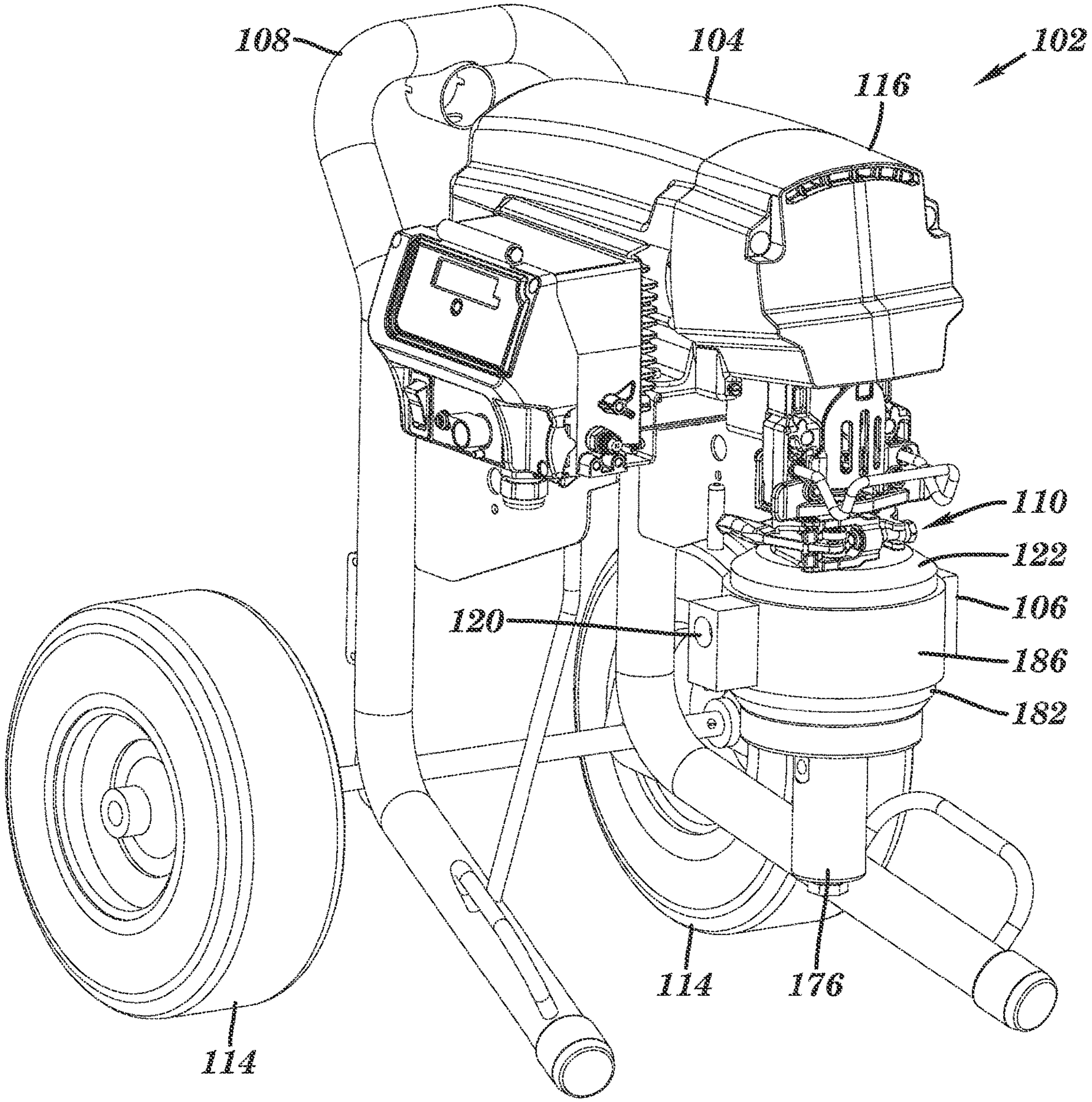
FIG. 6 is an isometric view of a modular diaphragm pump system having an integrated dampener.

FIG. 6 is an isometric view of a modular diaphragm pump system 102 similar to that of FIGS. 1-5 except that the diaphragm pump 106 of the embodiment of FIG. 6 includes an integrated dampener 176. Components sharing the first two digits of a reference numbers (e.g., 2, 102; 6, 106; 10, 110; 16, 116, etc.) of different embodiments can have similar configurations amongst the various illustrated and described embodiments, unless otherwise noted or incompatible. For example, the reciprocating power unit 116 can be identical in form and/or function to the reciprocating power unit 16 except for those aspects shown or described to be incompatible. For the sake of brevity, common aspects (e.g., materials, features, functions, properties, etc.) are not repeated for different embodiments even though the different embodiments may share the same aspects. For all referenced embodiments, an aspect described and/or shown for one embodiment can be implemented in another embodiment unless otherwise described or shown to be incompatible.

The modular diaphragm pump system 102 of FIG. 6 includes a reciprocating power unit 116 having a motor 104, structural frame 108, pump coupling 110, wheels 114, and drive mechanism. The modular diaphragm pump system 102 includes a diaphragm pump 106 which can mount on the pump coupling 110, and be operated by the reciprocating power unit 116, in any manner referenced herein. The diaphragm pump 106 includes a main housing 186 onto which a first cover 122 and a second cover 182 are attached. The diaphragm pump 106 includes inlet port 120. The main housing 186, the first cover 122, and the second cover 182 form a housing of the diaphragm pump 106. Below the second cover 182 and the main housing 186, and integrated into the diaphragm pump 106, is a dampener 176. The dampener 176 is further shown in FIG. 7.

FIG. 7 is a cross sectional view of the diaphragm pump 106. The diaphragm pump 106 includes a drive rod 128, including head 130, which can make a dynamic connection with a drive mechanism of the modular diaphragm pump system 102. The diaphragm pump 106 also includes a pump neck 126. Located between the pump neck 126 and drive rod 128 is a seal 168 formed by a stack of packing rings, as previously described. Nut 112 can be moved along the pump neck 126 for clamping as previously described. The pump neck 126 can be directly attached, or integral and continuous with, first cover 122. The first cover 122 can be attached to main housing 186.

The diaphragm pump 106 includes a diaphragm 154A sandwiched between the first cover 122 and the main housing 186. The first cover 122 is attached (e.g., threaded, bolted, or welded) to the main housing 186. The diaphragm 154A is linked to the drive rod 128 such that the center of the diaphragm 154A moves linearly up and down with the reciprocation of the drive rod 128 while the rim of the diaphragm 154A stays stationary. In the illustrated embodiment, plates 164A-B sandwich a center portion of the diaphragm 154, secured by connector 158. A side channel 178 can be formed in the main housing 186 as a side branch of the material of the main housing 186 (such a side branch could alternatively be bolted or welded to the main housing 186).

The diaphragm pump 106 includes a dampener 176. The dampener 176 includes a cylinder 198, a piston 190 which linearly moves within the cylinder 198, and a dampener diaphragm 154B. The dampener diaphragm 154B is held between the main housing 186 and the second cover 182. The second cover 182 is attached to the bottom of the main housing 186 (e.g., threaded, bolted, or welded). The rim of the dampener diaphragm 154B may be pinched or otherwise held in place between the main housing 186 and the second cover 182. The dampener diaphragm 154B is linked to the piston 190 such that the piston 190 moves linearly up and down with the center of the dampener diaphragm 154B while the rim of the dampener diaphragm 154B stays stationary. In the illustrated embodiment, plates 164C-D sandwich a center portion of the dampener diaphragm 154B. The plates 164C-D are coupled by connector 158B which can be a bolt that threads into the respective plates 164C-D. The bottom plate 164D can attach (e.g., by threading) to the top of the piston 190.

The diaphragm 154A divides an interior space defined by the main housing 186 and the first cover 122 into a first chamber 152 and a second chamber 166. A dampener diaphragm 154B divides an internal space defined by the main housing 186 and the second cover 182 into a third chamber 180 and a fourth chamber 184. The diaphragm 154A seals the first chamber 152 with respect to the second chamber 166 such that fluid does not flow or leak from the first chamber 152 to the second chamber 166. Likewise, the dampener diaphragm 154B seals the third chamber 180 with respect to the fourth chamber 184 such that fluid does not flow or leak from the third chamber 180 to the fourth chamber 184. In this way, fluid flows from the inlet port 120 to the outlet port 118 without loss of fluid.

The diaphragm pump 106 is shown to include two check valves 160, 162 to allow the diaphragm 154A to productively draw fluid through inlet port 120, past check valve 162, around the side channel 178, through the first chamber 152 (the pumping chamber), past the check valve 160, through the third chamber 180, and out the outlet port 118. In this way, the fluid is pumped upsteam-to-downstream, the inlet port 120 representing the upstream direction and the outlet port 118 representing the downstream direction. In operation, the bottom side of the diaphragm 154A contacts working fluid but the top side of the diaphragm 154A does not. The diaphragm pump 106 operates by the movement of the diaphragm 154A making the first chamber 152 alternately larger and smaller. Specifically, when the drive rod 128 is on the upstroke, the upward motion of the diaphragm 154A increases the volume of the first chamber 152 and pulls upstream working fluid past check valve 162 and into the first chamber 152. This is reversed on the down stroke when the diaphragm 154A moves downwards to decrease the volume of the first chamber 152 to force working fluid in the first chamber 152 downstream past check valve 160. Check valves 160, 162 prevent retrograde downstream-to-upstream fluid flow. Working fluid expelled from the first chamber 152 flows through the side channel 178 and then into the third chamber 180. The cyclical movement of the diaphragm 154A causing alternating suction and expelling phases can cause undesirable downstream pressure and flow pulsations. The dampener 176 is provided to reduce downstream pressure variations and create constant fluid flow. Specifically, the dampener diaphragm 154B moves to reduce downstream flow pulsation (e.g., pressure and/or flow pulsation out of the outlet port 118) due to upstream flow pulsation created by movement of the diaphragm 154A.

As the fluid flow out of the first chamber 152 increases and decreases in a pulsating manner, the dampener diaphragm 154B flexes to dampen the pressure spikes and to store and release fluid during the suction stroke of the diaphragm 154A in the first chamber 152. The dampener diaphragm 154B is attached to an air control spool by connector 158B that can increase or decrease the air pressure in the fourth chamber 184 to maintain the optimum dampening effect as the diaphragm 154A in the first chamber 152 is cycled back in forth. The dampener 176 operates by the center of the dampener diaphragm 154B moving downward when the pressure within the third chamber 180 spikes and moving upward when the pressure in the third chamber 180 drops to buffer the pressure in the third chamber 180. For example, when the pressure in the third chamber 180 spikes above the pressure within the fourth chamber 184, the higher pressure in the third chamber 180 pushes the dampener diaphragm 154B downward to increase the size of the third chamber 180, thus momentarily lowering the pressure within the third chamber 180 and decreasing flow through the third chamber 180. When the pressure in the third chamber 180 drops below the pressure within the fourth chamber 184, pressure within the fourth chamber 184 moves the dampener diaphragm 154B upward to decrease the size of the third chamber 180, thus momentarily raising the pressure within the third chamber 180 and increasing flow through the third chamber 180. The piston 190 has some range of motion while the pressure within the fourth chamber 184 is maintained. However, the piston 190 forms part of an air control spool that can increase or decrease the air pressure in the fourth chamber 184 in order to maintain the optimum dampening effect.

The position of the piston 190 is controlled in part by the pressure within the third chamber 180 and the fourth chamber 184. The pressure within the fourth chamber 184 can be changed based on the position of the piston 190. A pneumatic input port 194A of the cylinder 198 accepts pressurized air (or a fluid under pressure) from a conventional compressor, tank, or other supply (not illustrated) known in the art. The piston 190 has a first seal 192A, a second seal 192B, and a third seal 192C. These seals 192A-C can each be an O-ring that seals between the piston 190 and the cylinder 198. The dampener 176 does not accept the flow of pressurized air from the pneumatic input port 194A as long as the pneumatic input port 194A is between the first and second seals 192A-B. However, if the pressure in the third chamber 180 is greater than the pressure in the fourth chamber 184, then the dampener diaphragm 154B will be pushed downward which will move the piston 190 downward as well. If the disparity in pressure is great enough, the first seal 192A will pass the pneumatic input port 194A and then pressurized air will flow into a recess 196 between the cylinder 198 and the piston 190 and then into the fourth chamber 184 to increase the pressure in the fourth chamber 184 and cause the dampener diaphragm 154B to move upwards. The first seal 192A then moves up past the pneumatic input port 194A to stop the flow from the pneumatic input port 194A. The fourth chamber 184 then remains at the higher pressurized and sealed to continue to buffer the pressure and flow within the third chamber 180.

The fourth chamber 184 can be partially or completely exhausted to relieve pressure on the third chamber 180 via the dampener diaphragm 154B. Specifically, if the pressure within the third chamber 180 drops enough, the higher pressure within the fourth chamber 184 causes the dampener diaphragm 154B to move upwards, lowering the volume and momentarily increasing the pressure within, and flow through, the third chamber 180. To prevent the dampener diaphragm 154B from moving too far upwards, an exhaust port 194B is in fluid communication with the fourth chamber 184. The exhaust port 194B is ordinarily prevented from exhausting by the second and third seals 192B-C. However, if the third seal 192C and/or the bottom of the piston 190 moves above the exhaust port 194B, pressure can be relieved from the fourth chamber 184 as air exhaust through the exhaust port 194B and within the cylinder 198 below the piston 190 to atmosphere. Eventually, the pressure within the third chamber 180 becomes higher than the pressure in the fourth chamber 184, at which point the dampener diaphragm 154B will be forced downwards and the third seal 194B and/or piston 190 will once again seal the exhaust port 194B.

The dampener 176 is an integrated part of the diaphragm pump 106. Dismounting of the diaphragm pump 106 from the reciprocating power unit 116 necessarily includes removal of the dampener 176 from the reciprocating power unit 116. Likewise, mounting of the diaphragm pump 106 on the reciprocating power unit 116 includes mounting the dampener 176. The dampener 176 is attached to the second cover 182 (e.g., threaded, bolted, or welded) such that the dampener 176 is indirectly attached to the main housing 186. In some embodiments, the second cover 182 is omitted and the dampener 176 is attached directly to the main housing 186. The main housing 186 and the dampener 176 are fixed to one another and are part of the same integrated fluid pumping module. The main housing 186 contacts, and secures by pinching, both of the pumping diaphragm 154A and dampener diaphragm 154B. The first chamber 152 of the diaphragm pump 6 and the third chamber 180 of the dampener 176 share a common wall 188 of the main housing 186.

The integration of the dampener 176 with the diaphragm pump 106 minimizes the length and complexity of the fluid path between the diaphragm pump 6 and the dampener 176 to increase the ability of the dampener 176 to buffer pressure extremes. For example, once working fluid exits the check valve 160, the working fluid need only round two 90 degree bends (or one 180 degree turn-around) of the side channel 178 to encounter the third chamber 180 of the dampener 176. No external hoses or tubes are needed to connect the fluid path between the first and third chambers 152, 180.

This short distance minimizes the potential for leaks to develop along the fluid path and ensures responsiveness of the dampener 176.

Several components are aligned in this integrated assembly of the diaphragm pump 106. Each of the diaphragm 154A, the dampener diaphragm 154B, the drive rod 128, the piston 190, the cylindrical pump neck 126, and the cylinder 198 are coaxially aligned. Coaxial alignment of these moving and non-coming parts can help balance the diaphragm pump 106 and minimize vibration during operation.

Although "top" and "bottom", "up" and "down", and "upstream" and "downstream" are used herein for convenience to correspond to the orientations shown, these and other embodiment need not have such orientation. For example, for parts having "top" and "bottom" designations herein, "first" and "second" designations can alternatively be used.

The present disclosure is made using different embodiments to highlight various inventive aspects. As such, the disclosure presents the inventive aspects in an exemplar fashion and not in a limiting fashion. Modifications can be made to the embodiments presented herein without departing from the scope of the invention. For example, a feature disclosed in connection with one embodiment can be integrated into a different embodiment. As such, the scope of the inventions are not limited to the embodiments disclosed herein.

The following is claimed:

1. A modular diaphragm pump for use with a reciprocating power unit on which the modular diaphragm pump can be mounted and dismounted, the modular diaphragm pump comprising:

a diaphragm;

a drive rod;

a housing, the housing comprising a first cover, a second cover connected to the first cover, and a neck projecting from the first cover, the diaphragm located within the housing between the first cover and the second cover, the drive rod connected to the diaphragm such that the diaphragm is moved by the drive rod, the housing and the diaphragm forming a first chamber and a second chamber, the first chamber formed in part by a first side of the diaphragm and the second chamber formed in part by a second side of the diaphragm, the diaphragm configured to be moved via the drive rod to expand and contract the volume of the first chamber to pump fluid through the first chamber, wherein each of the first cover, the second cover, and the diaphragm are wider than the neck, and wherein the drive rod extends entirely through the neck and into the second chamber;

an inlet port and a first check valve, the inlet port in fluid communication with the first chamber through the first check valve, both of the inlet port and the first check valve supported by the housing;

an outlet port and a second check valve, the outlet port in fluid communication with the first chamber through the second check valve, both of the outlet port and the second check valve supported by the housing;

a coupling that mounts the module diaphragm pump to the reciprocating power unit, the coupling formed by the neck and a head on the drive rod, the neck configured to make a static connection with the reciprocating power unit that fixes the housing with respect to the reciprocating power unit, the head configured to make a dynamic connection with the reciprocating power unit such that the reciprocating power unit can move the diaphragm relative to the housing by moving the drive rod, wherein the coupling is configured to allow the modular diaphragm pump to be dismounted from the reciprocating power unit by disengaging the static connection and the dynamic connection.

2. The modular diaphragm pump of claim 1, wherein the coupling is configured to mount the modular diaphragm pump on the reciprocating power unit by a sliding motion of the modular diaphragm pump relative to the reciprocating power unit which simultaneously engages the static connection and the dynamic connection.

3. The modular diaphragm pump of claim 1, wherein the coupling is configured to dismount the modular diaphragm pump from the reciprocating power unit by a sliding motion of the modular diaphragm pump relative to the reciprocating power unit which simultaneously disengages the static connection and the dynamic connection.

4. The modular diaphragm pump of claim 1, wherein the first chamber is located below the diaphragm and the second chamber is located above the diaphragm.

5. The modular diaphragm pump of claim 1, wherein the neck comprises a peripheral protrusion.

6. The modular diaphragm pump of claim 1, wherein the head comprises a narrow part below a wider part.

7. The modular diaphragm pump of claim 1, wherein the second chamber is configured to hold a gas under pressure such that the gas applies pressure on the second side of the diaphragm to increase the pumping force generated by the modular diaphragm pump.

8. The modular diaphragm pump of claim 7, wherein the gas expands on a downstroke of the modular diaphragm pump to increase pumping stroke force, and the gas is recompressed on the upstroke of the modular diaphragm pump.

9. The modular diaphragm pump of claim 7, further comprising a seal located around the drive rod and in contact with the drive rod, the seal blocking release of the gas.

10. The modular diaphragm pump of claim 1, wherein the modular diaphragm pump further comprises a dampener mounted to the housing, the dampener comprising a second diaphragm that moves to reduce downstream flow pulsation due to upstream flow pulsation created by movement of the diaphragm.

11. The modular diaphragm pump of claim 10, wherein the second diaphragm is coaxial with the diaphragm.

12. The modular diaphragm pump of claim 11, wherein the dampener comprises a piston that is pneumatically driven to compensate for upstream flow pulsation.

13. The modular diaphragm pump of claim 1, wherein the neck is located above the diaphragm.

14. The modular diaphragm pump of claim 1, wherein the first check valve and the second check valve are integrated into the second cover.

15. The modular diaphragm pump of claim 1, wherein the inlet port and the outlet part are each located on the second cover.

16. The modular diaphragm pump of claim 1, wherein air moves freely in and out of the second chamber during pumping.

17. The modular diaphragm pump of claim 16, wherein a channel through the first cover allows air to move freely in and out of the second chamber during pumping.

18. The modular diaphragm pump of claim 1, wherein drive rod is a single piece.

19. The modular diaphragm pump of claim 1, wherein the drive rod is connected to the diaphragm by a connector.

20. The modular diaphragm pump of claim 19, wherein the connector comprises two plates that sandwich the diaphragm.

* * * * *